(12) United States Patent
Haskell (10) Patent No.: US 8,867,624 B2
(45) Date of Patent: Oct. 21, 2014

(54) H.264/AVC BASED APPROACH TO SCALABLE VIDEO COMPRESSION

(75) Inventor: Paul Haskell, Saratoga, CA (US)

(73) Assignee: Harmonic Inc., San Jose, CA (US)

( * ) Notice: Subject to any disclaimer, the term of this patent is extended or adjusted under 35 U.S.C. 154(b) by 449 days.

(21) Appl. No.: 13/237,624

(22) Filed: Sep. 20, 2011

(65) Prior Publication Data

US 2012/0008677 A1 Jan. 12, 2012

Related U.S. Application Data

(62) Division of application No. 12/014,054, filed on Jan. 14, 2008, now Pat. No. 8,170,121.

(60) Provisional application No. 60/987,704, filed on Nov. 13, 2007.

(51) Int. Cl.
*H04N 11/02* (2006.01)
*H04N 19/112* (2014.01)
*H04N 19/61* (2014.01)
*H04N 19/30* (2014.01)

(52) U.S. Cl.
CPC ... *H04N 19/00048* (2013.01); *H04N 19/00781* (2013.01); *H04N 19/00424* (2013.01)
USPC .................................................. 375/240.26

(58) Field of Classification Search
USPC ............. 375/240.01, 240.02, 240.03, 240.04, 375/240.12, 240.24, 240.26
See application file for complete search history.

(56) References Cited

U.S. PATENT DOCUMENTS

| | | | |
|---|---|---|---|
| 5,953,506 A | 9/1999 | Kalra et al. | |
| 6,038,256 A | 3/2000 | Linzer et al. | |
| 6,091,776 A | 7/2000 | Linzer | |
| 6,310,915 B1 | 10/2001 | Wells et al. | |
| 6,961,377 B2 | 11/2005 | Kingsley et al. | |
| 2007/0009039 A1* | 1/2007 | Ryu | 375/240.16 |
| 2009/0147848 A1* | 6/2009 | Park et al. | 375/240.13 |

OTHER PUBLICATIONS

Tudor, P.N., "MPEG-2 Video Compression," tutorial, Electronics & Communication Engineering Journal, Dec. 1995, 17 pp.
Wiegand, T. et al., "Study text (version 3) of ISO/IEC 14496-10:2005/FPDAM3 Scalable Video Coding (in integrated form with ISO/IEC 14996-10)," ISO/IEC JTC 1/SC 29/WG 11 N 8962 Apr. 2007, San Jose, CA, 568 pp.
International Standard ISO/IEC 14496-10, Third edition Dec. 15, 2005, Corrected version Mar. 1, 2006, "Information technology—Coding of audio-visual objects—Part 10: Advanced Video Coding," 356 pp.
International Staandard ISO/IEC 14496-10:2005, Technical Corrigendum 2, Aug. 15, 2006, "Information technology—Coding of audio-visual objects—Part 10: Advanced Video Coding," 3 pp.

* cited by examiner

*Primary Examiner* — Anh Ngoc Nguyen
(74) *Attorney, Agent, or Firm* — Haynes Beffel & Wolfeld LLP; Warren S. Wolfeld (57) ABSTRACT

A scalable video compression method and apparatus for encoding an input frame sequence having temporally sequential frames includes partitioning each of the frames of the input frame sequence into a top field and a bottom field to form a base layer sequence of fields and an enhancement layer sequence of fields. The base layer sequence and the enhancement layer sequence each comprise temporally alternating top and bottom fields of the partitioned frames of the input frame sequence. The base layer sequence and the enhancement layer sequence are encoded, wherein at least one field of the enhancement layer sequence is encoded in dependence upon at least one of the fields of the base layer sequence.

21 Claims, 7 Drawing Sheets

H.264/AVC BASED APPROACH TO SCALABLE VIDEO COMPRESSION

CROSS-REFERENCE TO RELATED APPLICATIONS

This application is a divisional of U.S. patent application Ser. No. 12/014,054 filed 14 Jan. 2008, which application claims the benefit of U.S. Provisional Application No. 60/987,704, filed 13 Nov. 2007, entitled H.264/AVC Based Approach to Scalable Video Compression, each of which is incorporated by reference herein.

BACKGROUND OF THE INVENTION

1. Field of the Invention

The present invention relates in general to scalable video compression and more particularly to a system and method for encoding, transmitting, decoding and storing a video sequence such as High Definition television signals (HDTV) using a base layer and an enhancement layer.

2. Description of Related Art

Scalable Coding of video refers to compression techniques that result in a compressed bitstream in which one or more subsets of the whole bitstream can be decoded at reduced quality (such as reduced resolution, frame rate, or bit-rate). Scalable coding techniques have been present in most video compression standards, including MPEG-1 and MPEG-2. Examples of scalable video coding include compression of a High Definition (HD) bitstream in which a Standard Definition (SD) subset can be decoded, or compression of a 60 Hz bitstream in which a 30 Hz subset can be decoded.

A particular application of scalable video compression arises because many TV operators are planning to deploy 1080P @ 60 Hz video services in the next few years. This format is what is used by most of the high-end consumer HD displays currently being purchased. The fact that this format is scanned progressively eliminates the need for deinterlacing within the consumer display, and the 1080 line format offers higher resolution than the 720P format.

However, millions of HD decoders already have been deployed by the TV operators, and this installed base of decoders only can decode 720P @ 60 Hz or 1080I @ 60 Hz format video. Operators would like to be able to deliver 1080P content to next-generation receivers while still delivering the same content to their legacy receivers. To simulcast the old and new formats is expensive in bit-rate, and scalable coding offers an attractive solution.

The Joint Video Team (JVT) of the ISO/MPEG group and the ITU-T have developed a Scalable Video Coding (SVC) standard based on H.264/AVC. This standard includes a great deal of flexibility for scalable coding of video, and its compression tools offer high efficiency. However, the complexity of the SVC technology is high, both for encoders and decoders.

A need therefore exists for a scalable video compression method for the legacy-vs-1080P application described above, without the complexity of the JVT SVC specification.

SUMMARY OF THE INVENTION

The present invention provides methods and apparatus for encoding and decoding scalable coded video.

A scalable video compression method for encoding an input frame sequence having temporally sequential frames as described herein includes partitioning each of the frames of the input frame sequence into a top field and a bottom field to form a base layer sequence of fields and an enhancement layer sequence of fields. The base layer sequence and the enhancement layer sequence each comprise temporally alternating top and bottom fields of the partitioned frames of the input frame sequence. Each given field of the base layer sequence comprises one of the top and bottom fields of a corresponding partitioned frame of the input frame sequence, and a temporally corresponding field of the enhancement layer sequence comprises the other of the top and bottom fields of the corresponding partitioned frame of the input frame sequence. The method further includes encoding the base layer sequence to form a base layer bitstream, and encoding the enhancement layer sequence to form an enhancement layer bitstream. At least one field of the enhancement layer sequence is encoded in dependence upon at least one of the fields of the base layer sequence. The method further includes outputting the base layer bitstream and the enhancement layer bitstream.

A method for decoding as described herein includes decoding a base layer bitstream into a decoded base layer sequence of fields, and decoding an enhancement layer bitstream into a decoded enhancement layer sequence of fields. At least one field of the decoded enhancement layer sequence of fields is decoded in dependence upon at least one of the fields of the decoded base layer sequence. A given field of the decoded base layer sequence comprises one of the top and bottom fields of a corresponding frame of a frame sequence, and a temporally corresponding field of the enhancement layer sequence comprises the other of the top and bottom fields of the corresponding frame of the frame sequence. The method further includes combining the decoded base layer sequence and the decoded enhancement layer sequence to form a decoded frame sequence, wherein each frame of the decoded frame sequence comprises the temporally corresponding field of the decoded base layer sequence and the temporally corresponding field of the decoded enhancement layer sequence. The method further includes outputting the decoded frame sequence.

As described above, there exists a need to remain backwards-compatible with previous technologies due to a significant investment in the technology by hardware manufacturers, television operators, software developers, and consumers. In addition, due to commercial, regulatory, and physical constraints only a constrained overall bit-rate is available for transmitting a video signal.

Embodiments of the present invention address these needs by generating a scalable compressed video stream including the base layer bitstream and the enhancement layer bitstream. The base layer bitstream can be encoded into a video format chosen for compliance with decoders employing previous technologies. The base layer bitstream is also compressed in a manner such that it can be decoded without any knowledge or use of the enhancement layer bitstream. Furthermore, since the enhancement layer bitstream is encoded in dependence upon the fields of the base layer sequence, high coding efficiency can be achieved for the scalable compressed video stream.

Other aspects and advantages of the present invention can be seen on review of the drawings, the detailed description and the claims, which follow.

DETAILED DESCRIPTION

The following detailed description is made to illustrate the present invention, not to limit its scope, which is defined by the claims. Those of ordinary skill in the art will recognize a variety of equivalent variations on the description that follows. A detailed description of embodiments of the present invention is provided with reference to the FIGS. 1-8.

H.264/MPEG-4 Advanced Video Coding standard (H.264/AVC) is an industry standard for video compression jointly developed by the ITU-T Video Coding Experts Group (VCEG) and the ISO/IEC Moving Picture Experts Group (MPEG). H.264/AVC was developed in response to the growing need for higher compression of moving pictures for various applications such as videoconferencing, digital storage media, television broadcasting, Internet streaming, and communication. It is also designed to enable the use of the coded video representation in a flexible manner for a wide variety of network environments.

H.264/AVC has achieved better compression efficiency (i.e. better quality compressed video) and offers greater flexibility in compressing, transmitting, and storing video than earlier standards. The high coding efficiency of H.264/AVC gives perceptually equivalent video quality at a lower bitrate than earlier video coding standards such as MPEG-2. The documents establishing the H.264/AVC standard are hereby incorporated by reference including "Advanced Video Coding for Generic Audiovisual Services" on March 2005 (ITU-T Rec. H.264 and ISO/IEC 14496-10). Due to the public nature of the H.264/AVC standard, the present specification will not attempt to document all the existing aspects of H.264/AVC, relying instead where necessary for the reader's knowledge of the incorporated specifications of the standard.

Because of the conflicting requirements of random access and highly efficient compression, two main coding types are specified in H.264/AVC. Intra coding (I-picture) is done without reference to other pictures. Intra coding may provide access points to the coded sequence where decoding can begin and continue correctly, but typically also achieves only moderate compression efficiency.

Inter coding (predictive (P-picture) or bi-predictive (B-picture)) is more efficient since it can use inter prediction of each block of sample values from some previously decoded picture selected by the encoder. In contrast to some other video coding standards, pictures coded using bi-predictive inter prediction may also be used as references for inter coding of other pictures.

The two fields of an interlaced frame are separated in capture time while the two fields of a progressive frame share the same capture time. Each field may be coded separately or the two fields may be coded together as a frame. Progressive frames are typically coded as a frame. For interlaced video, the encoder can choose between frame coding and field coding. Frame coding or field coding can be adaptively selected on a picture-by-picture basis and also on a more localized basis within a coded frame. Frame coding is typically preferred when the video scene contains significant detail with limited motion. Field coding typically works better when there is fast picture-to-picture motion.

A macroblock, consisting of a 16×16 block of luma samples and two corresponding blocks of chroma samples, is used as the basic processing unit of the video decoding process.

A macroblock can be further partitioned for inter prediction. The selection of the size of inter prediction partitions is a result of a trade-off between the coding gain provided by using motion compensation with smaller blocks and the quantity of data needed to represent the data for motion compensation.

The inter prediction process can form segmentations for motion representation as small as 4×4 luma samples in size, using motion vector accuracy of one-quarter of the luma sample grid spacing displacement. The process for inter prediction of a sample block can also involve the selection of the picture to be used as the reference picture from a number of stored previously-decoded pictures. Motion vectors are encoded differentially with respect to predicted values formed from nearby encoded motion vectors. Typically, the encoder calculates appropriate motion vectors and other data elements represented in the video data stream.

Both source pictures and prediction residuals have high spatial redundancy. H.264/AVC is based on the use of a block-based transform method for spatial redundancy removal. After inter prediction from previously-decoded samples in other pictures or spatial-based prediction from previously-decoded samples within the current picture, the resulting prediction residual is split into 4×4 blocks. These are converted into the transform domain where they are quantized. After quantization many of the transform coefficients are zero or have low amplitude and can thus be represented with a small amount of encoded data.

Scalable Video Compression Technique

Figure 1:
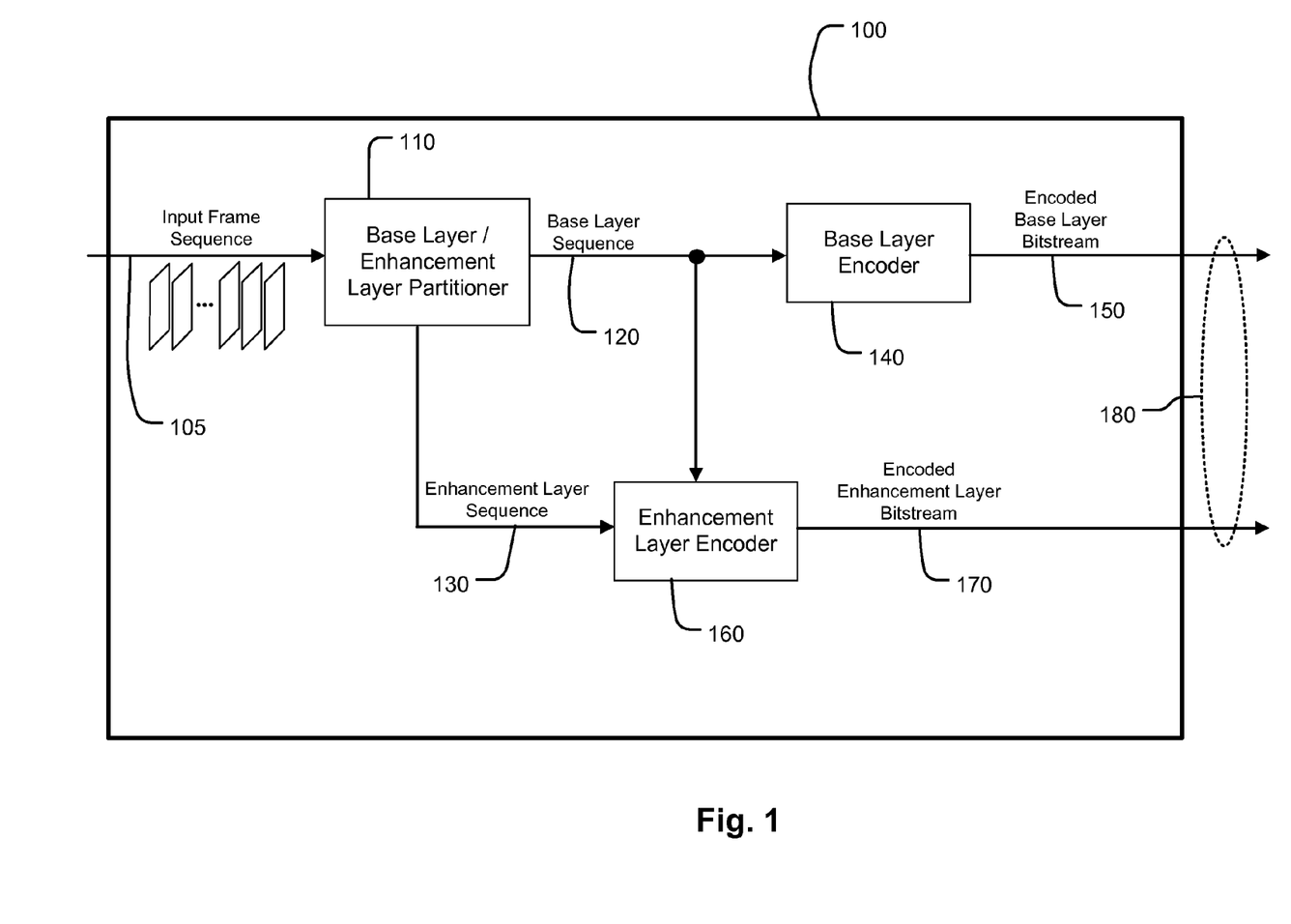
FIG. 1 illustrates a block diagram of an encoder provided an input frame sequence having temporally sequential frames.

FIG. 1 illustrates a block diagram of an encoder 100 provided an input frame sequence 105 having temporally sequential frames. In the illustrated embodiment the input frame sequence 105 comprises a resolution of 1920×1080, progressively scanned, at a 60 Hz frame rate.

As used herein, the term "encoder" will be used to refer broadly to any electronic device that encodes a sequence of frames, and the term "decoder" will be used to refer to any electronic device that decodes a sequence of frames. An encoder and a decoder can be a software or firmware programmed processor, application specific integrated circuit (ASIC), field programmable gate array (FPGA), coder/decoder (CODEC), digital signal processor (DSP) or some other electronic device that is capable of encoding or decoding the stream of pictures.

The encoder 100 includes partitioner 110 to partition the input frame sequence 105 into a base layer sequence 120 and an enhancement layer sequence 130. The partitioning of the input frame sequence 105 in partitioner 110 is further illustrated in FIG. 2.

Figure 2:
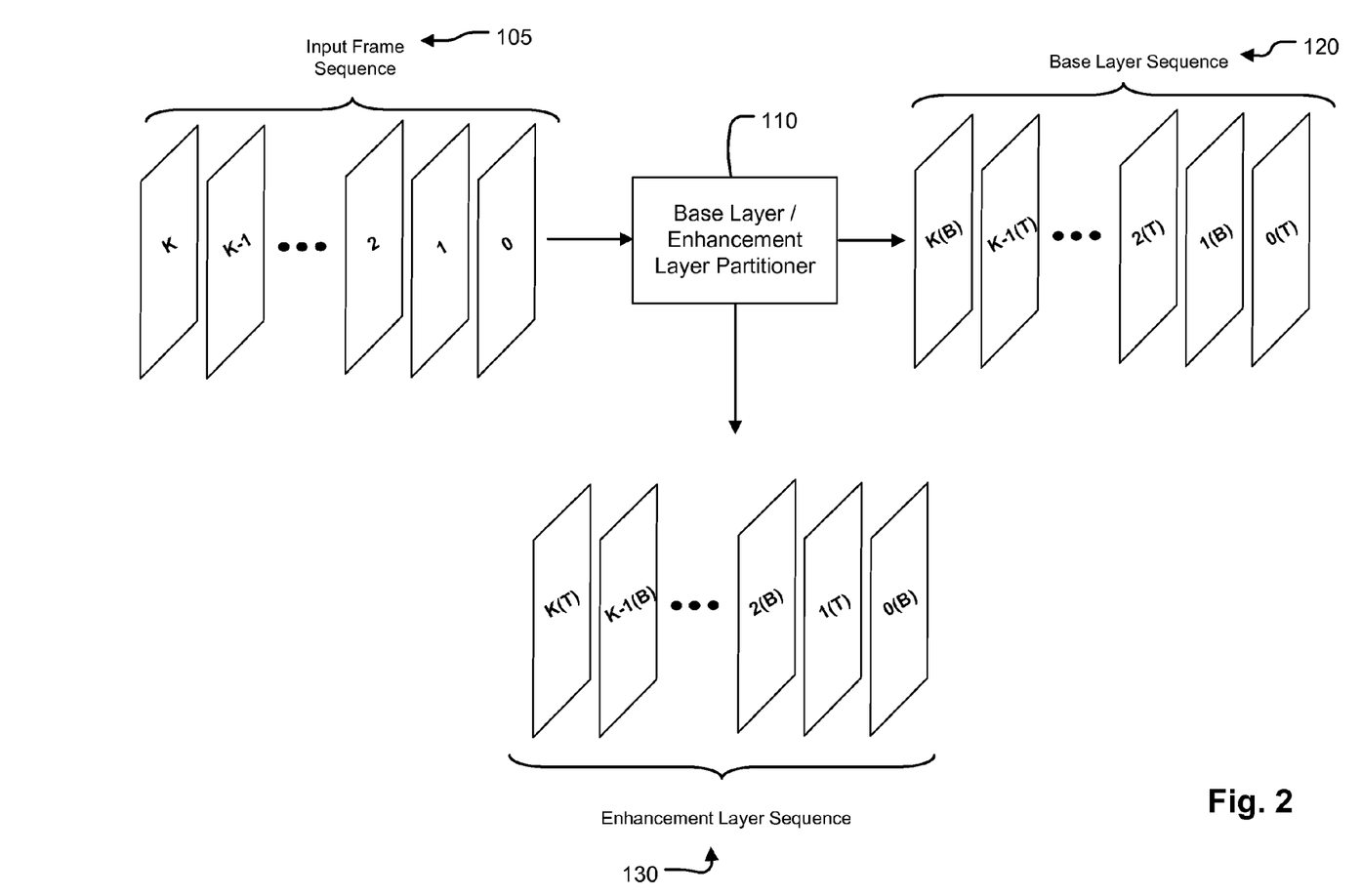
FIG. 2 further illustrates the partitioning of the input frame sequence.

As shown in FIG. 2, the input frame sequence 105 has temporally sequential frames $0, 1, \ldots, K$. In partitioner 110 each of the frames of the input frame sequence 105 are partitioned into a top field and a bottom field to form the base layer sequence 120 and the enhancement layer sequence 130.

As used herein a top field comprises even-numbered rows $0, 2, \ldots, H/2-1$ with H being the number of rows of the corresponding frame of the input sequence. As used herein a bottom field comprises the odd-numbered rows of the corresponding frame.

As can be seen in FIG. 2, the base layer sequence 120 and the enhancement layer sequence 130 comprise temporally alternating top and bottom fields of the partitioned frames of the input frame sequence 105. Each field of the base layer sequence 120 comprises one of the top and bottom fields of a corresponding partitioned frame of the input frame sequence 105, and a temporally corresponding field of the enhancement layer sequence 130 comprises the other of the top and bottom fields of the corresponding partitioned frame of the input frame sequence 105.

For example, frame 0 of the input frame sequence 105 is partitioned into a top field 0(T) comprising the even lines of frame 0 and a bottom field 0(B) comprising the odd lines of input frame 0, and the first field of the base layer sequence 120 is the top field 0(T) and the first field of the enhancement layer sequence 130 is the bottom field 0(B).

Alternatively, the first field of the base layer sequence 120 can be the bottom field 0(B) of the partitioned input frame 0, and the first field of the enhancement layer sequence 130 can be the top field 0(T) of the partitioned input frame 0.

In the illustrated embodiment the input frame sequence 105 comprises a 1080P @ 60 Hz sequence, and thus each of the base layer sequence 120 and the enhancement layer sequence 130 comprise a 1080I @ 60 Hz sequence of fields.

Referring back to FIG. 1, the base layer sequence 120 is provided to a base layer encoder 140 to generate an encoded base layer bitstream 150. The base layer bitstream 150 is compressed in a manner such that it can be decoded without any knowledge or use of the enhancement layer bitstream 170. Since the base layer sequence 120 is in standard 1080I @ 60 Hz format, conventional mechanisms can be used to encode it. For example, the method described in the H.264/AVC standard, for AVC encoding of 1080I @ 60 Hz video, can be used.

In FIG. 1 the partitioner 110 is shown separately from the base layer encoder 140 and the enhancement layer encoder 160. As can be understood, the functions of the partitioner 110 may be incorporated into the base layer encoder 140 and the enhancement layer encoder 160. For example, the partitioner module 110 may be removed entirely and the full input frame sequence 105 provided to both the base layer encoder 140 and the enhancement layer encoder 160. In such a variation the base layer encoder 140 would select the odd lines from one frame and the even lines from the next, and so on, ignoring the lines it does not need. Similarly, the enhancement layer encoder 160 would select the lines of each frame which are ignored by the base layer encoder 140, and ignore the lines selected by the base layer encoder 140. Additionally, although the base layer encoder 140 and the enhancement layer encoder 160 are shown separately, the functions of the base layer encoder 140 and the enhancement layer encoder 160 may be combined into a single hardware or software implementation depending upon the application.

There exists a need to remain backwards-compatible with previous technologies due to a significant investment by hardware manufacturers, television operators, software developers, and consumers. Thus, the base layer bitstream 150 can be encoded into a video format chosen for compliance with decoders employing previous technologies.

The encoded base layer bitstream 150 is encoded in a format dependent upon the application, and in the illustrated embodiment the encoded base layer bitstream 150 is encoded as defined by the well-known H.264/AVC standard. Other formats may alternatively be used, including well-known formats or otherwise, as well as formats yet to be developed.

In the illustrated embodiment in which the input frame sequence 105 comprises a 1080P @ 60 Hz sequence and the base layer sequence 130 therefore comprises a 1080I @ 60 Hz sequence, the base layer bitstream 150 can be decoded by conventional 1080I @ 60 Hz decoders. Again, such decoders can use the techniques described in the above-incorporated H.264/AVC standard.

Figure 3:
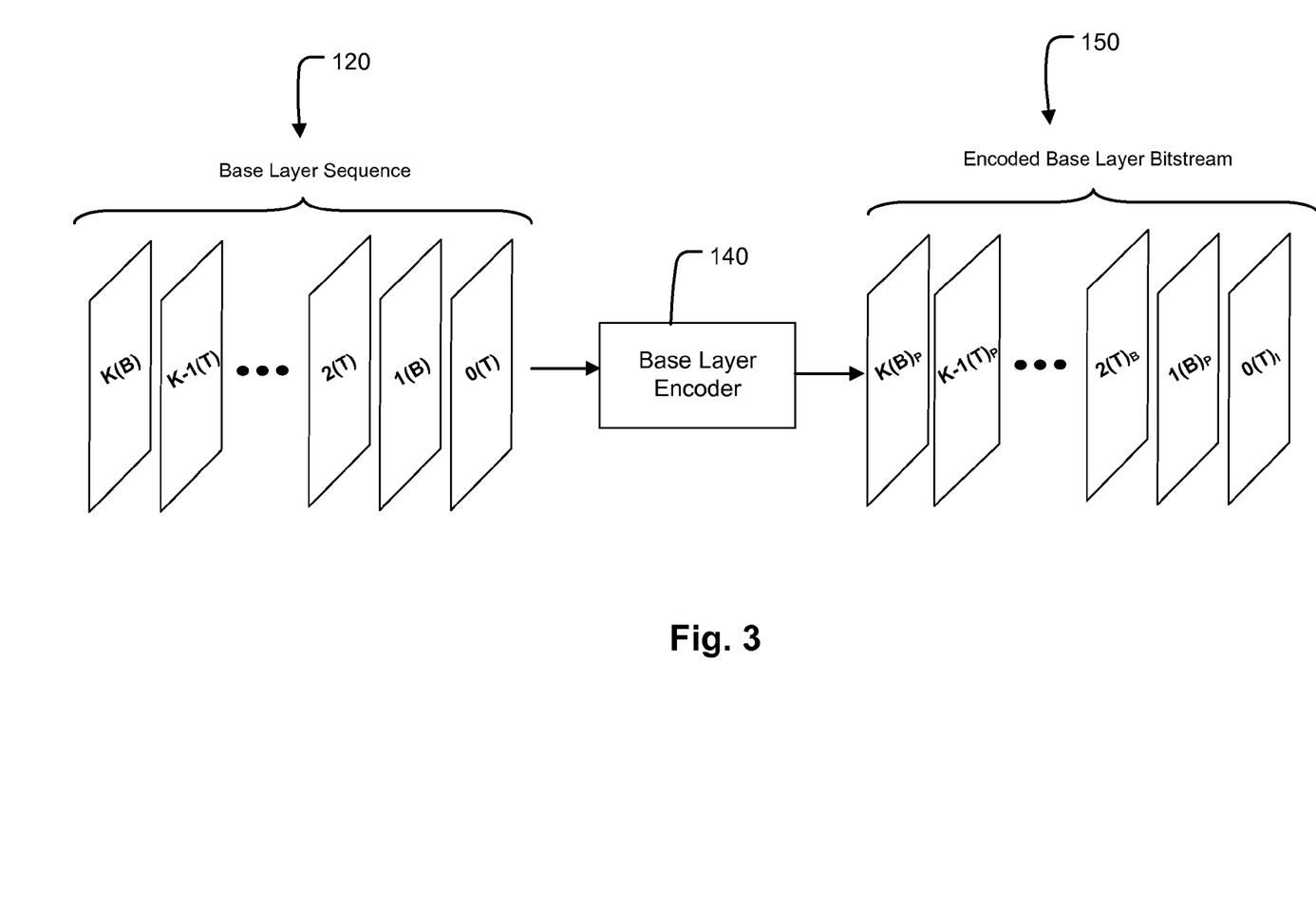
FIG. 3 further illustrates the encoding of the base layer sequence.

The encoding of the base layer sequence 120 is further illustrated in FIG. 3.

In FIG. 3 the base layer encoder 140 encodes the base layer sequence 120 using a group of picture (GOP) structure IP BB BB BB PP BB BB BB PP. As shown in FIG. 3, the first field 0(T) of the base layer sequence 120 is encoded as an I picture $0(T)_I$, the second field 1(B) of the base layer sequence 120 is encoded as a P picture $1(B)_P$, and so on. The number and particular order of the I, B, and P pictures in FIG. 3 are given as an example configuration of the pictures, but are not necessary to implement the present invention. Any number of I, B, and P pictures can be used in any order to best serve a particular application. The H.264/AVC standard does not impose any limit to the number of B pictures between two reference pictures nor does it limit the number of pictures between two I pictures.

In the illustrated embodiment of FIG. 3 the base layer sequence 120 is shown for illustrated purposes as encoded using field coding. However, it will be understood that since the base layer sequence 120 consists of an interlaced video sequence, the encoder 140 can choose between frame coding and field coding. Frame coding or field coding can be adaptively selected on a picture-by-picture basis and also on a more localized basis within a coded frame.

The encoded base layer bitstream 150 includes not only the picture data itself but also the information to enable a decoder to re-create the predictions, information about the structure of the compressed data and the compression tools used during encoding, and information about the complete video sequence. Thus, the encoded base layer bitstream 150 includes the picture data and all the meta-data necessary to reconstruct the pictures. These streams are sometimes referred to as "bitstreams", but the units of the stream in various embodiments can be bits, bytes, picture fields, frames, or any other unit that is appropriate for the embodiment.

Referring back to FIG. 1, the encoder 100 also includes an enhancement layer encoder 160. The enhancement layer sequence 130 is provided, along with the base layer sequence 120, to the enhancement layer encoder 160 to generate encoded enhancement layer bitstream 170. The encoding of the enhancement layer sequence 130 is further illustrated in FIG. 4.

Figure 4:
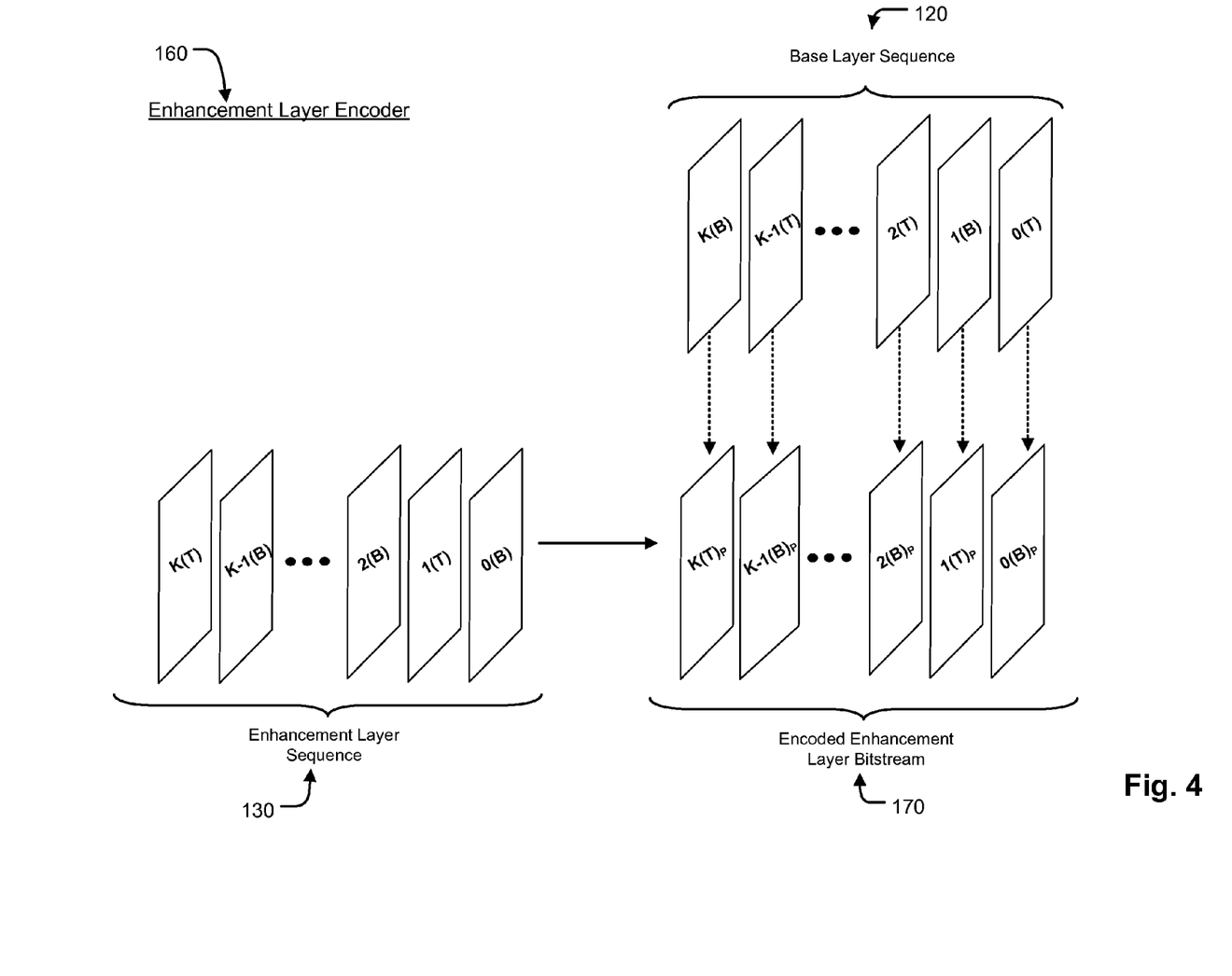
FIG. 4 further illustrates the encoding of the enhancement layer sequence.

As shown in FIG. 4, each field of the enhancement layer sequence 130 is encoded as a P-picture as defined by the H.264/AVC standard using the temporally corresponding field of the base layer sequence 120 as a reference. Alternatively, the enhancement layer sequence 130 may be encoded in formats other than those described in H.264/AVC.

As used herein, using a field of the "base layer sequence as a reference" preferably means encoding using inter prediction, so that only motion vectors and prediction residuals need to be encoded. Therefore, high coding efficiency can be achieved for the enhancement layer bitstream 170 using the technique illustrated in FIG. 4 since a respective field of the enhancement layer sequence 130 may have high correlation with the temporally corresponding field of the base layer sequence 120.

Alternatively, fields of the enhancement layer sequence 130 can be encoded as a P-picture using different fields of the base layer sequence 120 as references, for example using at least one non-temporally corresponding field of the base layer sequence 120 as a reference. The H.264/AVC standard allows multiple references for each field instead of one or two as used in past standards. The use of multiple reference pictures can improve the accuracy of the temporal prediction with motion compensation algorithm by allowing the encoder to find a block in any of multiple reference pictures that most closely matches the block that is to be encoded.

Some or all of the fields of the enhancement layer sequence 130 may alternatively be encoded as B-pictures using fields from the base layer sequence 120 as references. In another alternative some or all of the fields of the enhancement layer sequence 130 may be encoded using fields of both the enhancement layer sequence 130 and the base layer sequence 120 as references. Additionally, in yet another alternative some of the fields of the enhancement layer sequence 130 may be encoded as I-pictures.

Assuming sufficiently high quality coding decisions were used in the base layer encoder 140 and the enhancement layer encoder 160, the encoded enhancement layer bitstream 170 contains sufficient information, when combined with the encoded base layer bitstream 150, to re-construct a picture sequence with the same perceptual quality as the input frame sequence 105.

Referring again to FIG. 1, the encoder outputs a scalable compressed video stream 180 comprising the encoded base layer bitstream 150 and the encoded enhancement layer bitstream 170. For example, the encoded base layer bitstream 150 and the encoded enhancement layer bitstream 170 may be output separately on different Program identifiers (PIDs) or, as another example, on different IP sockets. Additional bitstreams may be included in other embodiments, such as an intermediate enhancement layer bitstream.

Due to commercial, regulatory, and physical constraints only a constrained overall total bit-rate is available for transmitting a video signal. In addition, there exists a need to remain backwards-compatible with previous technologies due to a significant investment in the technology by hardware manufacturers, television operators, software developers, and consumers.

Embodiments of the present invention address these needs by generating a scalable compressed video stream 180 including the base layer bitstream 150 and the enhancement layer bitstream 170. The base layer bitstream 150 is compressed in a manner such that it can be decoded without any knowledge or use of the enhancement layer bitstream 170. Furthermore, since the enhancement layer bitstream 170 is encoded in dependence upon the fields of the base layer sequence 120, high coding efficiency can be achieved for the scalable compressed video stream 180.

In the illustrated embodiment the base layer bitstream 150 and the enhancement layer bitstream 170 are encoded in the same format. Alternatively, the base layer bitstream 150 may be encoded into a first video format (such as MPEG-2) while the enhancement layer bitstream 170 may be encoded in a different video format (such as H.264/AVC).

Figure 5:
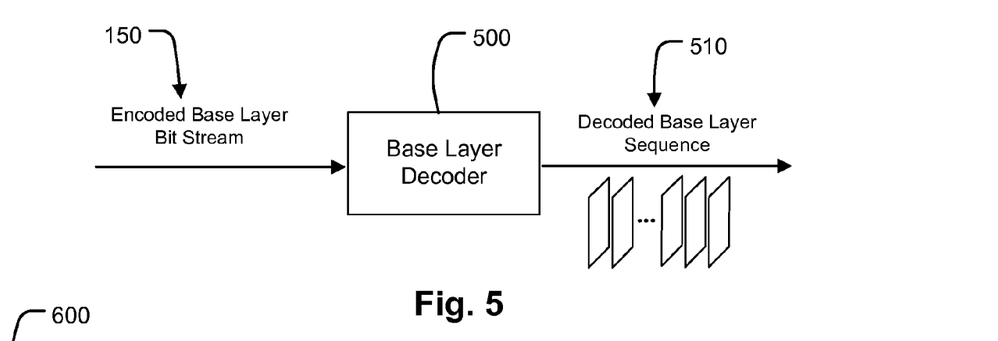
FIG. 5 illustrates a base layer decoder for decoding the base layer bitstream into a decoded base layer sequence.

As a result, a legacy base layer decoder 500 as illustrated in FIG. 5 can correctly decode the base layer bitstream 150 into a decoded base layer sequence 510. In the illustrated embodiment the base layer sequence 120 comprises a 1080I @ 60 Hz sequence, and thus the decoded base layer sequence 510 comprises a 1080I @ 60 Hz frame sequence.

Figure 6:
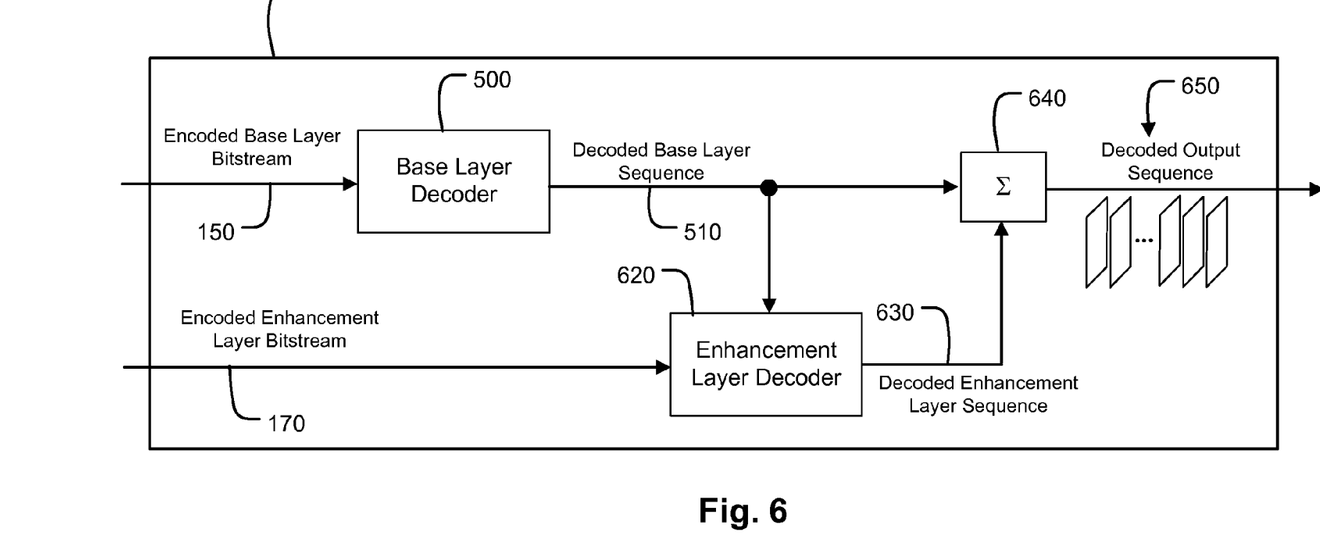
FIG. 6 illustrates a block diagram of an enhanced encoder receiving both the encoded base layer bitstream and the encoded enhancement layer bitstream.

FIG. 6 is a block diagram illustrating an enhanced decoder 600 receiving both the encoded base layer bitstream 150 and the encoded enhancement layer bitstream 170. The enhanced decoder 600 includes a base layer decoder 500 which is responsive to the encoded base layer bitstream 150 and generates the decoded base layer sequence 510.

The enhanced decoder 600 also includes an enhancement layer decoder 620. The enhancement layer decoder 620 decodes the encoded enhancement layer bitstream 170 into a decoded enhancement layer sequence 630 using the appropriate fields of the decoded base layer sequence 510.

In the illustrated embodiment the enhancement layer bitstream 170 was encoded as defined by the H.264/AVC standard using the temporally corresponding field of the base layer sequence 120 as a reference. Accordingly, in the illustrated embodiment the enhancement layer decoder 620 decodes the enhancement layer bitstream 170 using the temporally corresponding field of the decoded base layer sequence 510 as a reference. In alternative embodiments for encoding the enhancement layer sequence 130, such as those described above with reference to FIG. 4, the enhancement layer decoder 620 decodes the encoded enhancement layer bitstream 170 using the appropriate fields of the decoded base layer sequence 510.

The enhanced decoder 600 also includes combiner 640 for combining the decoded base layer sequence 510 with the decoded enhancement layer sequence 630 to generate a decoded output sequence 650. The enhanced decoder 600 outputs the decoded output sequence 650. For example, the decoded output sequence 650 may be stored in memory within or outside of systems implementing the enhanced decoder 600, or as another example may be stored on computer readable mediums. Also, the decoded output sequence 650 may be transmitted over a communication network such as interconnected computer systems and communication links. The communication links may be wireline links, optical links, wireless links, and combinations thereof or any other mechanisms for communication of information.

Figure 7:
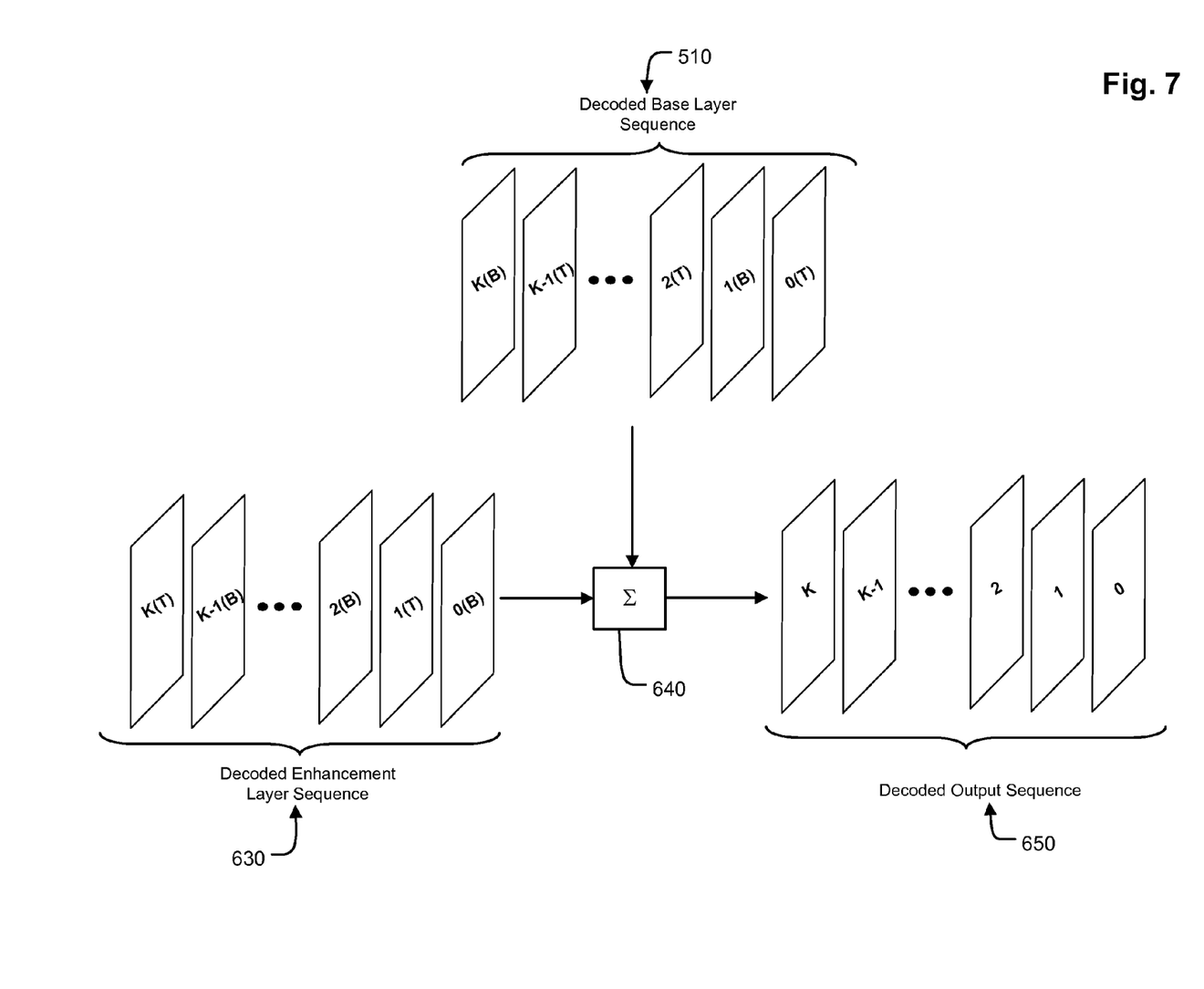
FIG. 7 further illustrates the combining operation of the combiner of FIG. 6.

The combining operation of combiner 640 is further illustrated in FIG. 7. As described above and illustrated in FIG. 7, a given field of the decoded base layer sequence 510 comprises one of the top and bottom fields of a corresponding partitioned encoded/decoded frame of the input frame sequence 105, and a temporally corresponding field of the decoded enhancement layer sequence 630 comprises the other of the top and bottom fields of the corresponding partitioned encoded/decoded frame of the input frame sequence 105.

Thus, the combining operation of combiner 640 combines a given field of the decoded base layer sequence 510 with the temporally corresponding field of the decoded enhancement layer sequence 630 to form each frame of the decoded output sequence 650. In the illustrated embodiment in which the input frame sequence 105 comprises 1080P @ 60 Hz the decoded output sequence 650 will also comprise 1080P @ 60 Hz sequence.

The required decoder processing power in terms of pixels per second is the same for this approach as is required for 1080P @ 60 Hz. However, there are no new SVC tools to be implemented.

In FIG. 6 the combiner 640 is shown separately from the base layer decoder 500 and the enhancement layer decoder 630. As can be understood, the functions of the combiner 640 may be incorporated into the enhancement layer decoder 620.

Additionally, although the base layer decoder 500 and the enhancement layer decoder 620 are shown separately, the functions of the base layer decoder 500 and the enhancement layer decoder 620 may be combined into a single hardware or software implementation depending upon the application.

As will be understood, the specific functions of the encoders and decoders described herein may be implemented in software executed by a general purpose computer and/or in specialized hardware designed to implement the specific functions of the encoders and/or decoders. Examples of the varying types of systems which may implement the encoders and/or decoders described herein include a personal computer, a network computer, a television, a set-top box, a mainframe, or any other data processing system or user device.

Furthermore, the encoded bitstreams described herein may be stored in memory within or outside of the systems implementing the encoder and/or the decoder, or as another example may be stored on computer readable mediums such as CD-ROM and DVD. Also, the encoded bitstreams may be transmitted over a communication network such as interconnected computer systems and communication links. The communication links may be wireline links, optical links, wireless links, and combinations thereof or any other mechanisms for communication of information.

Figure 8:
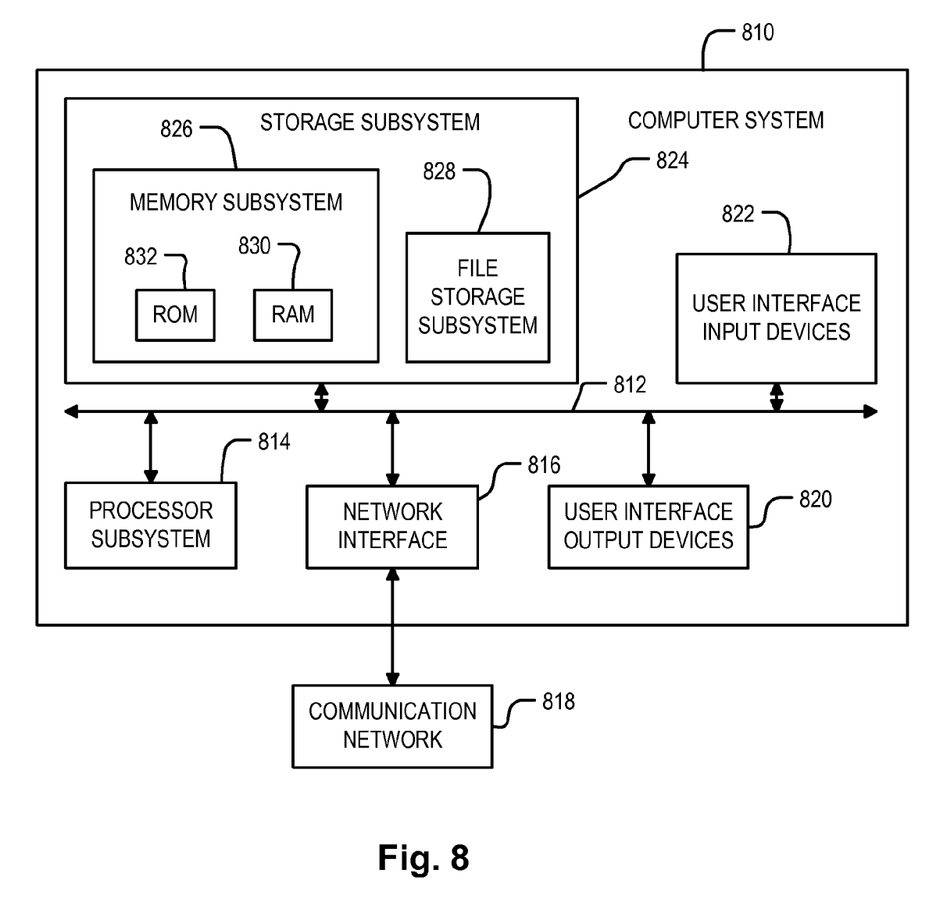
FIG. 8 is a simplified block diagram of a computer system that can be used to implement software incorporating aspects of the present invention.

FIG. 8 is a simplified block diagram of a computer system 810 that can be used to implement software incorporating aspects of the present invention. The computer system 810 can be used to implement either the encoder or decoder illustrated in FIGS. 1 and 6, or both. While FIGS. 1 and 6 illustrate individual functional blocks as carrying out specified operations, it will be appreciated that in a software embodiment each functional block actually causes the computer system 810 to operate in the specified manner. The individual functional blocks may be housed in separate software modules in the computer system, or they may be combined into a single module, or a combination of both, and flow through the modules may be sequential or pipelined.

Computer system 810 typically includes a processor subsystem 814 which communicates with a number of peripheral devices via bus subsystem 812. These peripheral devices may include a storage subsystem 824, comprising a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks, including an interface to communication network 818, and is coupled via communication network 818 to corresponding interface devices in other computer systems. Communication network 818 may comprise many interconnected computer systems and communication links. These communication links may be wireline links, optical links, wireless links, or any other mechanisms for communication of information. While in one embodiment, communication network 818 is the Internet, in other embodiments, communication network 818 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 822 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 810 or onto computer network 818.

User interface output devices 820 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 810 to the user or to another machine or computer system.

Storage subsystem 824 stores the basic programming and data constructs that provide the functionality of certain embodiments of the present invention. For example, the various modules implementing the functionality of certain embodiments of the invention may be stored in storage subsystem 824. These software modules are generally executed by processor subsystem 814.

Memory subsystem 826 typically includes a number of memories including a main random access memory (RAM) 830 for storage of instructions and data during program execution and a read only memory (ROM) 832 in which fixed instructions are stored. File storage subsystem 828 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 828. The host memory 826 contains, among other things, computer instructions which, when executed by the processor subsystem 814, cause the computer system to operate or perform functions as described herein. As used herein, processes and software that are said to run in or on "the host" or "the computer", execute on the processor subsystem 814 in response to computer instructions and data in the host memory subsystem 826 including any other local or remote storage for such instructions and data.

Bus subsystem 812 provides a mechanism for letting the various components and subsystems of computer system 810 communicate with each other as intended. Although bus subsystem 812 is shown schematically as a single bus, alternative embodiments of the bus subsystem may use multiple busses.

Computer system 810 itself can be of varying types including a personal computer, a portable computer, a workstation, a computer terminal, a network computer, a television, a mainframe, or any other data processing system or user device. Due to the ever changing nature of computers and networks, the description of computer system 810 depicted in FIG. 8 is intended only as a specific example for purposes of illustrating embodiments of the present invention. Many other configurations of computer system 810 are possible having more or less components than the computer system depicted in FIG. 8.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A scalable video compression method for encoding an input frame sequence having temporally sequential frames, the method comprising:
   partitioning each of the frames of the input frame sequence into a top field and a bottom field to form a base layer sequence of fields and an enhancement layer sequence of fields, the base layer sequence and the enhancement layer sequence each comprising temporally alternating top and bottom fields of the partitioned frames of the input frame sequence, wherein each given field of the base layer sequence comprises one of the top and bottom fields of a corresponding partitioned frame of the input frame sequence, and a temporally corresponding field of the enhancement layer sequence comprises the other of the top and bottom fields of the corresponding partitioned frame of the input frame sequence;
   encoding the base layer sequence to form a base layer bitstream;
   encoding the enhancement layer sequence to form an enhancement layer bitstream, wherein at least one field of the enhancement layer sequence is encoded in dependence upon at least one of the fields of the base layer sequence; and
   outputting the base layer bitstream and the enhancement layer bitstream.

2. The method of claim 1, wherein each field of the enhancement layer sequence is encoded in dependence upon at least one of the fields of the base layer sequence.

3. The method of claim 1, wherein the base layer bitstream contains sufficient information to be decoded into a picture sequence independently of the enhancement layer sequence.

4. The method of claim 1, wherein the step of encoding the base layer sequence comprises the step of encoding the base layer sequence into H.264/AVC format, and the step of encoding of the enhancement layer sequence comprises the step of encoding the enhancement layer sequence into H.264/AVC format.

5. The method of claim 1, wherein the input frame sequence comprises a 1080P @ 60 Hz sequence, and each of the base layer sequence and the enhancement layer sequence comprises a 1080I @ 60 Hz sequence.

6. The method of claim 1, wherein at least one field of the enhancement layer sequence is encoded as a P-picture using the temporally corresponding field of the base layer sequence as a reference.

7. The method of claim 6, wherein each field of the enhancement layer sequence is encoded as a P-picture using the temporally corresponding field of the base layer sequence as a reference.

8. The method of claim 1, wherein at least one field of the enhancement layer sequence is encoded as a P-picture using a non-temporally corresponding field of the base layer sequence as a reference.

9. The method of claim 1, wherein at least one field of the enhancement layer sequence is encoded as a B-picture using the temporally corresponding field of the base layer sequence as a reference.

10. The method of claim 9, wherein each field of the enhancement layer sequence is encoded as a B-picture using the temporally corresponding field of the base layer sequence as a reference.

11. An apparatus for encoding an input frame sequence having temporally alternating sequential frames, the apparatus comprising:
    a base layer encoder to encode a base layer sequence of fields comprising temporally alternating top and bottom fields of the input frame sequence; and
    an enhancement layer encoder to encode an enhancement layer sequence of fields comprising temporally alternating top and bottom fields of the input frame sequence, wherein at least one field of the enhancement layer sequence is encoded in dependence upon at least one of the fields of the base layer sequence, each given field of the base layer sequence comprising one of the top and bottom fields of a corresponding frame of the input frame sequence, and a temporally corresponding field of the enhancement layer sequence comprising the other of the top and bottom fields of the corresponding frame of the input frame sequence.

12. The apparatus of claim 11, further comprising a partitioner responsive to the input frame sequence to generate the base layer sequence of fields and the enhancement layer sequence of fields.

13. The apparatus of claim 11, wherein each field of the enhancement layer sequence is encoded in dependence upon at least one of the fields of the base layer sequence.

14. The apparatus of claim 11, wherein the base layer sequence contains sufficient information to be decoded into a picture sequence independently of the enhancement layer sequence.

15. The apparatus of claim 11, wherein the base layer encoder uses H.264/AVC format, and the enhancement layer encoder uses H.264/AVC format.

16. The apparatus of claim 11, wherein the input frame sequence comprises a 1080P @ 60 Hz sequence, and each of the base layer sequence and the enhancement layer sequence comprises a 1080I @ 60 Hz sequence.

17. The apparatus of claim 11, wherein the enhancement layer encoder encodes at least one of the fields of the enhancement layer sequence as a P-picture using the temporally corresponding field of the base layer sequence as a reference.

18. The apparatus of claim 17, wherein the enhancement layer encoder encodes each of the fields of the enhancement layer sequence as a P-picture using the temporally corresponding field of the base layer sequence as a reference.

19. The apparatus of claim 11, wherein the enhancement layer encoder encodes at least one of the fields of the enhancement layer sequence as a P-picture using a non-temporally corresponding field of the base layer sequence as a reference.

20. The apparatus of claim 11, wherein the enhancement layer encoder encodes at least one of the fields of the enhancement layer sequence as a B-picture using the temporally corresponding field of the base layer sequence as a reference.

21. The apparatus of claim 20, wherein the enhancement layer encoder encodes each of the fields of the enhancement layer sequence as a B-picture using the temporally corresponding field of the base layer sequence as a reference.

* * * * *